(12) United States Patent
Schwobe et al.

(10) Patent No.: US 10,155,126 B2
(45) Date of Patent: Dec. 18, 2018

(54) SOLENOID WITH SUPERVISION SWITCH

(71) Applicants: Patrick Thomas Schwobe, Slinger, WI (US); Derek Arvid Dahlgren, Sussex, WI (US); Benjamin Nathan Shimon, Pewaukee, WI (US)

(72) Inventors: Patrick Thomas Schwobe, Slinger, WI (US); Derek Arvid Dahlgren, Sussex, WI (US); Benjamin Nathan Shimon, Pewaukee, WI (US)

(73) Assignee: TLX Technologies, LLC, Pewaukee, WI (US)

(*) Notice: Subject to any disclaimer, the term of this patent is extended or adjusted under 35 U.S.C. 154(b) by 4 days.

(21) Appl. No.: 15/352,379

(22) Filed: Nov. 15, 2016

(65) Prior Publication Data

US 2017/0326395 A1 Nov. 16, 2017

Related U.S. Application Data

(63) Continuation-in-part of application No. 15/151,707, filed on May 11, 2016.

(51) Int. Cl.

| | |
|---|---|
| *F16K 37/00* | (2006.01) |
| *A62C 37/50* | (2006.01) |
| *A62C 37/10* | (2006.01) |
| *F16K 27/02* | (2006.01) |
| *F16K 31/06* | (2006.01) |
| *A62C 37/46* | (2006.01) |

(52) U.S. Cl.
CPC ............ *A62C 37/50* (2013.01); *A62C 37/10* (2013.01); *F16K 27/029* (2013.01); *F16K 31/0655* (2013.01); *F16K 31/0675* (2013.01); *F16K 37/0083* (2013.01); *A62C 37/46* (2013.01); *Y10T 137/8158* (2015.04)

(58) Field of Classification Search
CPC ..... A62C 37/50; A62C 37/10; F16K 37/0083; F16K 31/0025; F16K 31/0658; Y10T 137/8158

See application file for complete search history.

(56) References Cited

U.S. PATENT DOCUMENTS

| | | | |
|---|---|---|---|
| 3,664,430 | A | 5/1972 | Sitabkhan |
| 4,482,018 | A | 11/1984 | Enk et al. |
| 4,566,542 | A | 1/1986 | Enk et al. |
| 6,352,238 | B1 | 3/2002 | Roman |
| 6,488,099 | B2 | 12/2002 | McSheffrey et al. |
| 6,585,055 | B2 | 7/2003 | McSheffrey et al. |

(Continued)

FOREIGN PATENT DOCUMENTS

WO WO 2014/152295 A1 9/2014

*Primary Examiner* — Craig Schneider
*Assistant Examiner* — Kevin Barss
(74) *Attorney, Agent, or Firm* — Reinhart Boerner Van Deuren P.C.

(57) ABSTRACT

Embodiments of a solenoid valve are provided. The solenoid valve includes a solenoid portion with a detection device, a valve body, an armature assembly, and a detection plate. The armature assembly has a first end extending through the solenoid portion and a second end extending into the valve body. The detection plate is configured to interact with the detection device to produce a signal indicating whether the solenoid portion is installed on the valve body. The solenoid portion is disposed between the valve body and the detection plate.

20 Claims, 8 Drawing Sheets

(56) References Cited

U.S. PATENT DOCUMENTS

| | | |
|---|---|---|
| 6,649,829 B2 | 11/2003 | Garber et al. |
| 6,739,578 B2 | 5/2004 | Barton et al. |
| 6,897,374 B2 | 5/2005 | Garber et al. |
| 6,991,211 B2 | 1/2006 | Altonji |
| 7,081,815 B2 | 7/2006 | Runyon et al. |
| 7,174,769 B2 | 2/2007 | McSheffrey et al. |
| 7,174,783 B2 | 2/2007 | McSheffrey et al. |
| 7,188,679 B2 | 3/2007 | McSheffrey et al. |
| 7,574,911 B2 | 8/2009 | McSheffrey et al. |
| 7,726,411 B2 | 6/2010 | McSheffrey et al. |
| 7,841,357 B2 | 11/2010 | Rankin |
| 7,891,241 B2 | 2/2011 | McSheffrey et al. |
| 7,891,435 B2 | 2/2011 | McSheffrey et al. |
| 7,895,884 B2 | 3/2011 | McSheffrey et al. |
| 8,307,906 B2 * | 11/2012 | Reilly .................. A62C 35/64 169/16 |
| 9,062,788 B2 | 6/2015 | Mainland et al. |
| 9,103,461 B2 | 8/2015 | Dahlgren |
| 2003/0168620 A1 | 9/2003 | Dralyuk |
| 2004/0036273 A1 | 2/2004 | McClary |
| 2007/0247265 A1 | 10/2007 | Medrano et al. |
| 2010/0171624 A1 | 7/2010 | McSheffrey et al. |
| 2010/0192695 A1 | 8/2010 | McSheffrey et al. |
| 2010/0301245 A1 | 12/2010 | Accurso et al. |
| 2011/0048747 A1 | 3/2011 | Gastonides et al. |
| 2011/0240136 A1 | 10/2011 | Trottier |
| 2013/0126328 A1 | 5/2013 | Mainland et al. |

\* cited by examiner

SOLENOID WITH SUPERVISION SWITCH

CROSS-REFERENCE TO RELATED PATENT APPLICATION

This patent application is a Continuation-in-Part of co-pending U.S. patent application Ser. No. 15/151,707, filed May 11, 2016, the entire teachings and disclosure of which are incorporated herein by reference thereto.

FIELD OF THE INVENTION

This invention generally relates to solenoid valves. More particularly, the present invention relates to a supervision device for ensuring proper installation of solenoid valves.

BACKGROUND OF THE INVENTION

Fire suppression systems use pressurized containers of a fire suppressant material under high pressure. These pressurized containers are installed in a system that includes plumbing from each container to a location associated with the fire detection or fire alarm switch used to initiate delivery of the fire suppressant material from the container through the plumbing to suppress the fire. A latching solenoid is activated to operate a discharge valve coupled to the container to release the suppressant material from the pressurized container to the plumbing that delivers the suppressant material to the fire.

The solenoid valves coupled to the discharge valves of the pressurized containers must be periodically tested to ensure that the magnetic coil contained therein is properly operating. During testing, the magnetic coil is removed from the solenoid valve. Since such systems typically contain many such solenoid valves, the magnetic coil from each solenoid valve must be removed from the system, tested, and assuming that it passes the test, reinstalled into the system. Frequently, one or more magnetic coils is not reinstalled properly (or not reinstalled at all), which is a major problem that typically goes undetected.

The National Fire Protection Association has passed requirements that fire suppression systems having an electric actuator must be "supervised" and provide audible and visual indication of system impairment at the system's releasing control panel. This disclosure is intended to meet such requirements, as well as to detect if one of the magnetic coils is installed properly.

The apparatus of the present disclosure must also be of construction which is both durable and long lasting, and it should also require little or no maintenance to be provided by the user throughout its operating lifetime. In order to enhance the market appeal of the apparatus of the present disclosure, it should also be of inexpensive construction to thereby afford it the broadest possible market. Finally, it is also an objective that all of the aforesaid advantages and objectives be achieved without incurring any substantial relative disadvantage.

The invention provides such a solenoid valve. These and other advantages of the invention, as well as additional inventive features, will be apparent from the description of the invention provided herein.

BRIEF SUMMARY OF THE INVENTION

In one aspect, embodiments of a solenoid valve are provided. The solenoid valve includes a solenoid portion with a detection device, a valve body, an armature assembly, and a detection plate. The armature assembly has a first end extending through the solenoid portion and a second end extending into the valve body. The detection plate is configured to interact with the detection device to produce a signal indicating whether the solenoid portion is installed on the valve body. The solenoid portion is disposed between the valve body and the detection plate.

In embodiments of the solenoid valve, the detection plate is rotatable about the armature assembly. In such embodiments, the detection plate can be rotatable 360° about the armature assembly.

In other embodiments, the solenoid valve further includes a locking nut. The locking nut is configured to attach to the first end of the armature assembly and to retain the detection plate when the locking nut is removed from the solenoid valve. In certain preferred embodiments, the solenoid portion includes a depression adapted to receive at least a portion of the detection plate.

A variety of detection devices are possible. In some embodiments, the detection device is a limit switch having a plunger. In these embodiments, the plunger is actuated by the detection plate to produce the signal. In other embodiments, the detection device is a light sensor. In still other embodiments, the detection device and the detection plate interact using a proximity sensor on one of the detection device and the detection plate that senses the proximity of the other of the detection device and detection plate. In alternative embodiments, the detection device and the detection plate interact using an RFID sensor located on one of the detection device and the detection plate and an RFID chip located on the other of the detection device and the detection plate.

In a specific embodiment of the solenoid valve, the solenoid valve further includes a permanent magnet on the armature assembly such that the solenoid valve operates as a latching solenoid valve.

In one particular application, the solenoid valve is installed in a fire suppression or fire sprinkler system. In such applications, the solenoid valve can be adapted to control the release of the fire suppressant fluid upon receiving a signal from a control unit of the fire suppression or fire sprinkler system.

In another aspect, another embodiment of a solenoid valve is provided. The solenoid valve includes a valve body, a solenoid portion, and a rotatable plate. The solenoid portion can be rotatable relative to the valve body to a first angular orientation, and the rotatable plate can be rotatable relative to the valve body to a second angular configuration. The solenoid portion is preferably disposed between the valve body and the rotatable plate, and the second angular configuration is preferably equal to the first angular configuration.

In such embodiments of the solenoid valve, the rotatable plate can rotate to an angular orientation of 360° relative to the valve body.

In other embodiments of the solenoid valve, the solenoid portion includes a depression adapted to receive at least a portion of the rotatable plate. In these embodiments, the solenoid portion can rotate together with the rotatable plate relative to the valve body. Specifically, the solenoid portion can further include a conduit port adapted to receive electrical wires. The conduit port could then rotate together with the solenoid portion and rotatable plate relative to the valve body. Additionally, the solenoid portion can further include a detection device. In such embodiment, the detection device would preferably interact with the rotatable plate to produce a signal indicating whether the solenoid portion is installed on the valve body.

In a further aspect, embodiments of a locking nut configured to attach to an armature assembly of a solenoid valve are provided. The locking nut includes a cylinder member having an interior bore adapted to engage the armature assembly and a ring member that engages the outer perimeter of the cylinder member. The ring member protrudes from the surface of the cylinder member, and the ring member is configured to retain a detection plate of the solenoid valve when the locking nut is removed from the solenoid valve.

In embodiments of the locking nut, the locking nut further includes a circumferential groove around the cylinder member such that the ring member can be seated in the circumferential groove. The locking nut may also include a circumferential ledge around the cylinder member such that the circumferential ledge is spatially disposed from the ring member at a distance equal to or greater than a thickness of the detection plate.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Referring generally to the figures, various embodiments of a solenoid valve including a detection device are provided. The solenoid valve is particularly applicable for fire suppression systems (and more particularly for controlling the release of fire suppressant fluids, such as water, argon, carbon dioxide, nitrogen, etc.) and will be described primarily in the context of a fire suppression system. However, this discussion is provided by way of example only and not by way of limitation. A person having ordinary skill in the art will readily recognize from this disclosure that the presently invented solenoid valve with detection device can be utilized in a variety of different applications. Additionally, while a fire suppression system is discussed, the solenoid valve can be used with other systems, including wet and dry pipe sprinkler systems, deluge sprinkler systems, pre-action systems, foam water sprinkler systems, water spray systems, and water mist systems, among others.

Figure 1:
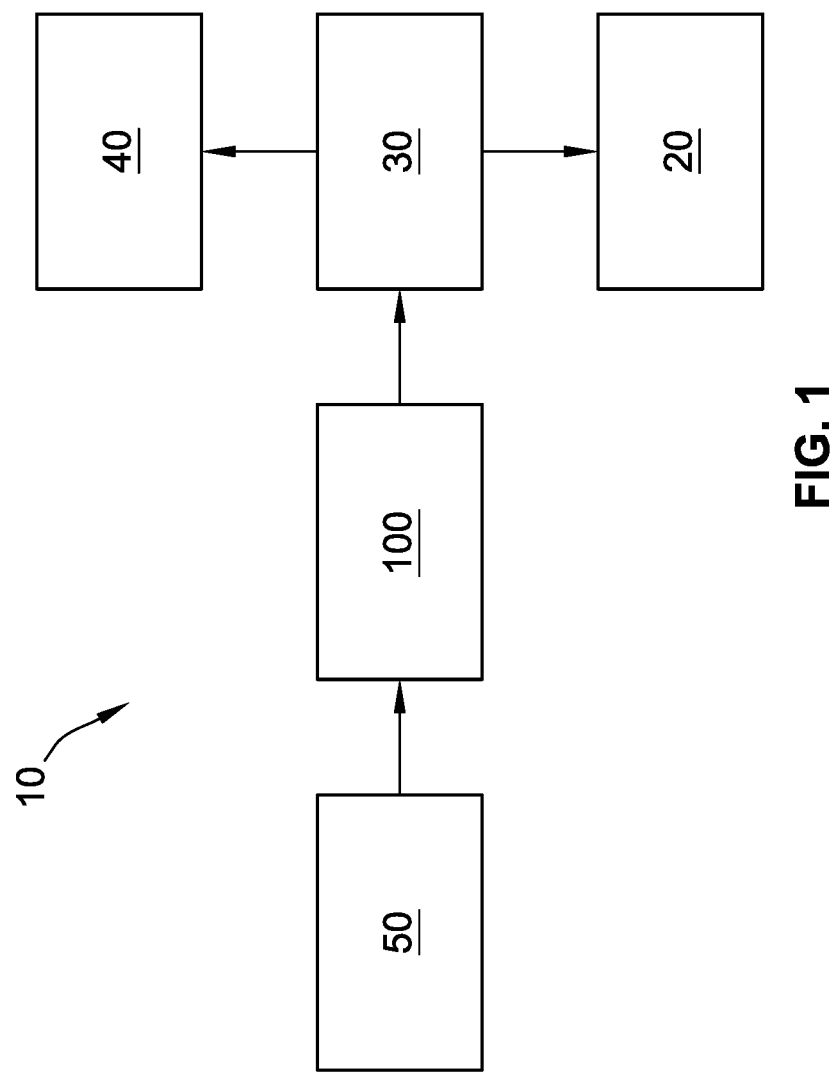
FIG. 1 is a schematic diagram of a fire suppression system incorporating the solenoid valve with detection device according to an exemplary embodiment.

A fire suppression system 10 is schematically depicted in FIG. 1. A fire suppression system 10 operates by discharging gas in the area of a fire to reduce the amount of oxygen in the area of the fire, thereby reducing the amount of fuel available for the combustion reaction. Without sufficient levels of oxygen, the fire will die out. To replace the oxygen in the area around the fire, the concentrations of other gases in the area of the fire are increased. Such replacement gases (referred to hereinafter as "fire suppressant fluids") include inter alia argon, nitrogen, and carbon dioxide. Notably, the level of oxygen does not need to be reduced to zero to cause a fire to die out. Instead, the level of oxygen can be made lower than the typical atmospheric concentration of 21%, which will allow any occupants remaining in the building in the vicinity of the fire to breath.

The fire suppressant fluids are stored in pressurized vessels 20 contained in or around the building for which the fire suppression system 10 is provided. A typical fire suppression system 10 will contain multiple pressurized vessels 20. The release of fire suppressant fluids from the pressurized vessels 20 is controlled by a discharge valve 30. A single discharge valve 30 can control the release of fire suppressant fluids from all of the pressurized vessels 20 in the fire suppression system 10, or a discharge valve 30 can be provided for each pressurized vessel 20 in the fire suppression system.

Upon release of the fire suppressant fluids from the pressurized vessels 20 through the discharge valve 30, the fire suppressant fluids are distributed throughout the building via a distribution network 40. The distribution network 40 includes plumbing conduit connected to discharge nozzles scattered at various points within the building. Depending on the fire suppression system 10, the distribution network 40 can deliver fire suppressant fluids to only the areas where fire is detected or to the entire building.

A control unit 50 triggers the release of the fire suppressant fluids from the pressurized vessels 20. The control unit 50 receives electrical or mechanical signals that indicate the presence of a fire from smoke detectors, temperature probes, or other thermo-mechanical fire sensors. Upon receipt of such signals, the control unit 50 provides an electrical impulse to a solenoid valve 100. A pneumatic line runs between the solenoid valve 100 and the discharge valve 30, such that the discharge valve 30 is pneumatically actuated. The pneumatic line is pressurized prior to activation of the fire suppression system 10 such that discharge valve 30 is in a closed state, i.e., no fire suppressant fluids are released from the pressurized vessels 20. The pneumatic line remains pressurized prior to activation of the fire suppression system 10 because the solenoid valve 100 is also closed. Thus, when the control unit 50 provides an electrical impulse to the solenoid valve 100, the solenoid valve 100 opens, releasing air from the pneumatic line. The drop in pressure on the pneumatic line causes actuation of discharge valve 30 to the open position, releasing the fire suppressant fluids stored in the pressurized vessels 20. Thus, proper functioning of the solenoid valve 100 is critical to the operation of the fire suppression system 10. Should the solenoid valve 100 be improperly installed or missing, such as after an inspection, the fire suppression system 10 would not operate in the case of a fire.

Figure 2:
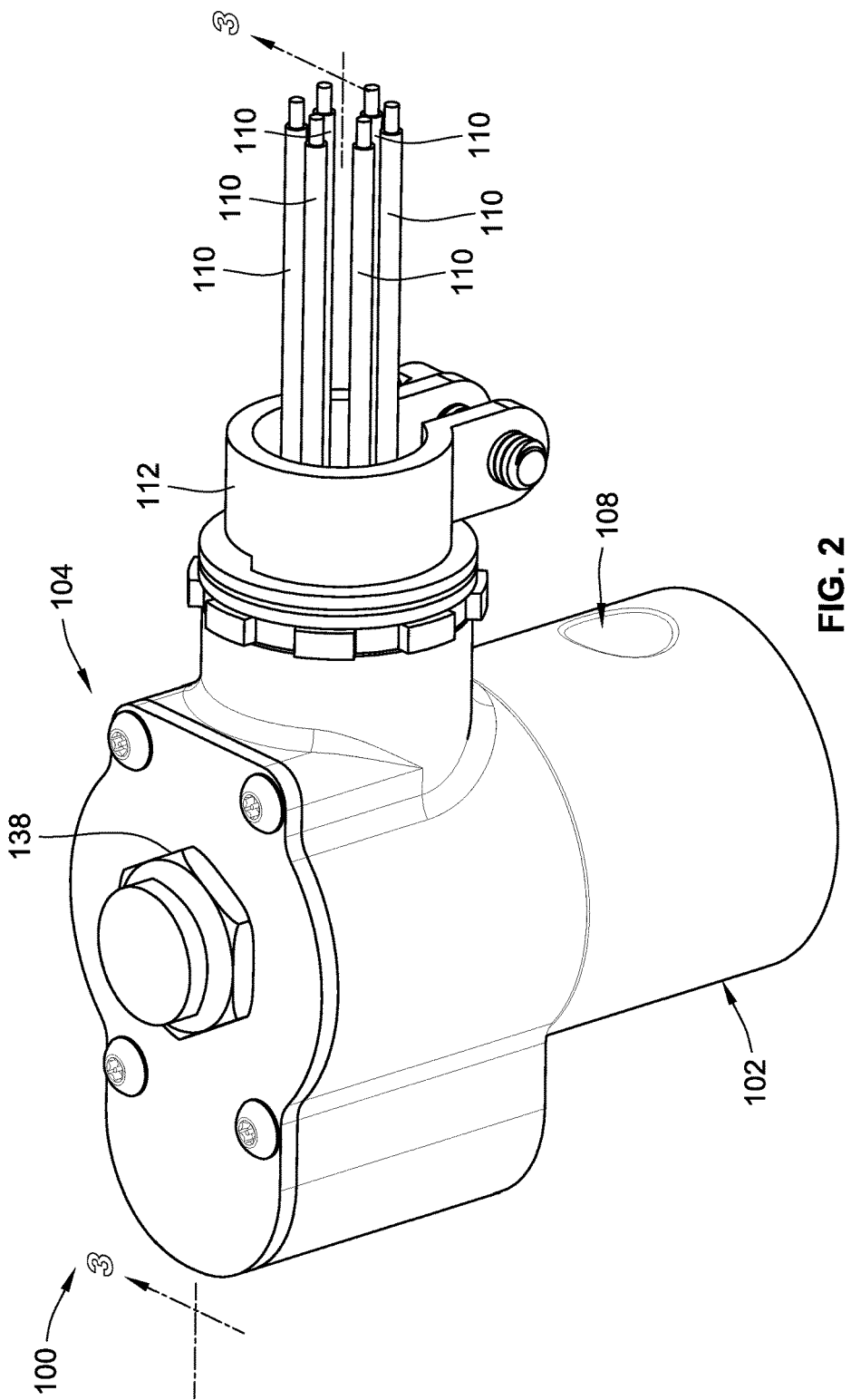
FIG. 2 is an isometric view of the solenoid valve with detection device according to an exemplary embodiment.

As can be seen in FIG. 2, the solenoid valve 100 is generally comprised of a valve body 102 and a solenoid portion 104. The valve body 102 defines an inlet port 106 (shown in FIG. 3) and an outlet port 108. The solenoid portion 104 controls flow of fluid from the inlet port 106 through the valve body 102 and out of the outlet port 108. In the context of the fire suppression system 10 of FIG. 1, the inlet 106 is connected to the pneumatic line running between the solenoid valve 100 and the discharge valve 30. The outlet 108 does not need to be connected to anything in particular as the air in the pneumatic line can simply be released into the environment. The solenoid portion 104 is electrically actuated. Electrical signals are provided to the solenoid portion 104 via wires 110 that enter a housing 111 of the solenoid portion 104 through a conduit port 112.

Figure 3:
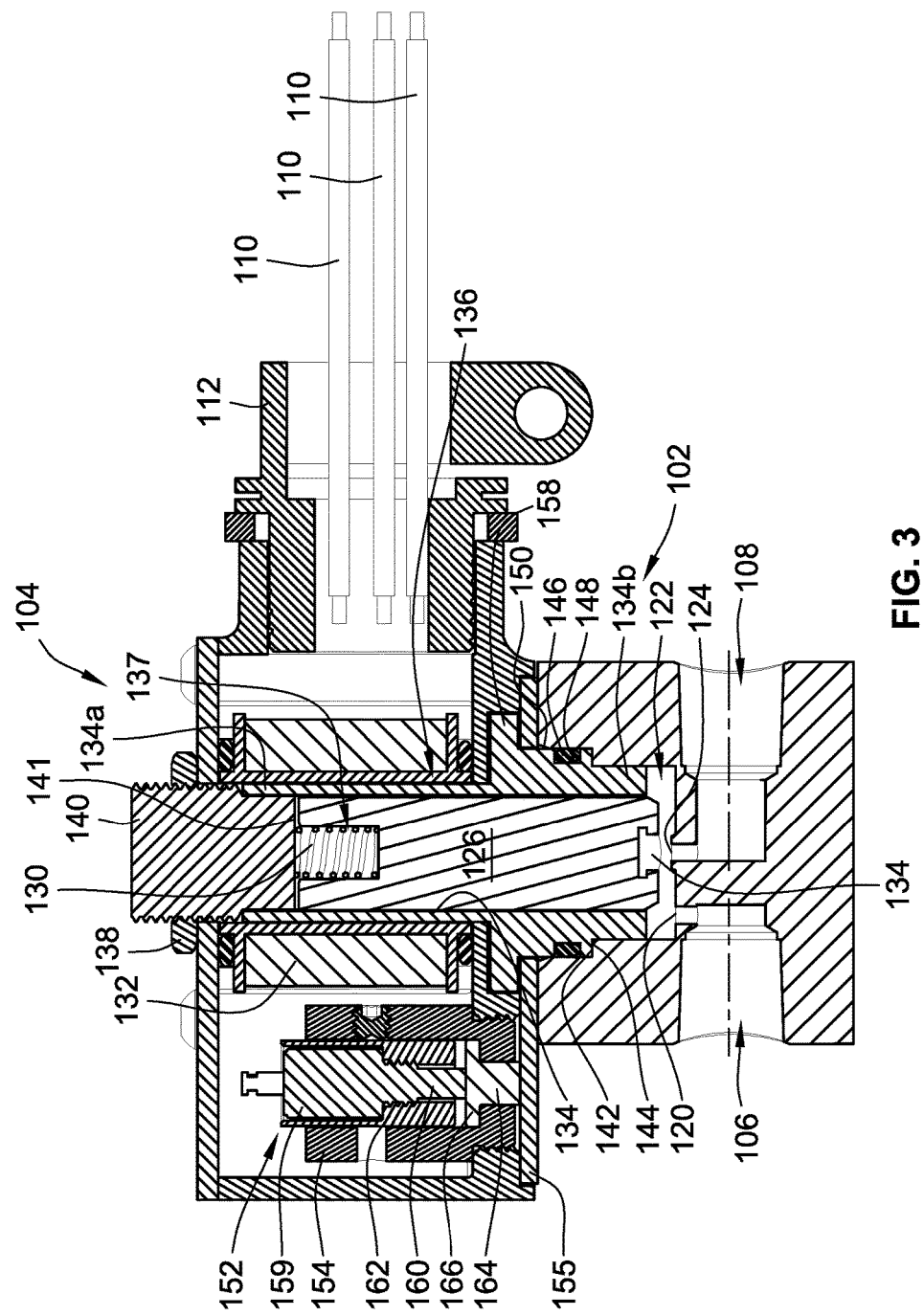
FIG. 3 is a cross-sectional view of the solenoid valve with detection device shown in FIG. 2.

Referring now to FIG. 3, the valve body 102 includes an inlet orifice 120 that is in fluid communication with the inlet 106 and with a valve chamber 122. The valve chamber 122 is in further fluid communication with an outlet orifice 124, and the outlet orifice 124 is in fluid communication with the outlet port 108. Thus, flow of fluid through the valve body 102 occurs from inlet 106, through inlet orifice 120, into valve chamber 122, out through outlet orifice 124, and out of the valve body 102 through outlet 108. Flow in this manner is able to occur unless an armature 126 linearly aligned with the outlet orifice 124 blocks the flow of fluid through the valve chamber 122.

The solenoid valve 100 is a normally closed valve, i.e., in a default setting, the armature 126 blocks the flow of fluid through the valve chamber 122. Upon actuation of the armature 126 by the solenoid portion 104, the armature 126 will retreat from its default position over the outlet orifice 124 to a retracted position, allowing fluid flow through the valve body 102. FIG. 3 depicts the armature 126 in the retracted position. In preferred embodiments, an orifice plug 127 provides a seal around the outlet orifice 124 to prevent the leakage of fluid from the valve chamber 122. In other embodiments, the solenoid valve 100 can be a normally open valve in which the default setting of the armature 126 is to allow the flow of fluid through the valve chamber 122.

Whether the armature 126 is in the default position or retracted position is controlled via interactions between a spring 130 and a magnetic coil 132. Still referring to FIG. 3, the armature 126 and spring 130 are arranged linearly within an armature sleeve 134 that is adapted to be received in a first bore 135 of the solenoid portion 104. Collectively, the armature 126, spring 130, and armature sleeve 134 are referred to as the armature assembly 136. The armature sleeve 134 has a first end 134a and a second end 134b with the second end 134b being seated within the valve body. The spring 130 is a compression spring and is disposed between the armature 126 and the first end 134a of the armature sleeve 134. In certain embodiments, the armature 126 includes a spring cavity 137 into which the spring 130 is seated. The magnetic coil 132 is preferably cylindrical in shape and is placed circumferentially around the armature sleeve 134.

In operation, the armature 126 is maintained in the default position by mechanical force from the spring 130. In order to move the armature 126 into the retracted position, the magnetic coil 132 is energized with electric current from wires 110 so as to produce a magnetic force sufficient to overcome the mechanical spring force. Thereby, the armature 126 can be maintained in the retracted position as long as the magnetic coil is energized.

In another embodiment, the solenoid valve 100 is a latching solenoid valve. In such an embodiment, a permanent magnet 141 is provided at the first end 134a of the armature sleeve 134. The permanent magnet has a magnetic force sufficient to hold the armature 126 in the retracted position if the armature 126 is brought into contact with the permanent magnet. However, because the spring 130 is a compression spring, the armature 126 is kept at a distance far enough away from the permanent magnet that the magnetic force of the permanent magnet is not sufficient at that distance to overcome the spring force. Thus, in the latching solenoid embodiment, when the magnetic coil 132 is energized, the magnetic field strength is strong enough to overcome the mechanical spring force. In this way, the armature 126 is brought into contact with the permanent magnet and can be held there by the permanent magnet even when the magnetic coil 132 is de-energized.

Because the armature 126 can only be moved between the default and retracted positions via actuation by the magnetic coil 132, the magnetic coil 132 is periodically inspected to ensure proper functioning. If the magnetic coil 132 were not functioning, then the control unit of the fire suppression system 10 would be unable to trigger the solenoid valve 100 to release the pressure on the discharge valve assembly and the clean agent cylinders. The magnetic coil 132 is not tested while the solenoid portion 104 is engaged with the valve body 104 because energization of a properly functioning magnetic coil 132 will cause the armature 126 to retract, triggering unwanted activation of the fire suppression system 10.

Figure 4:
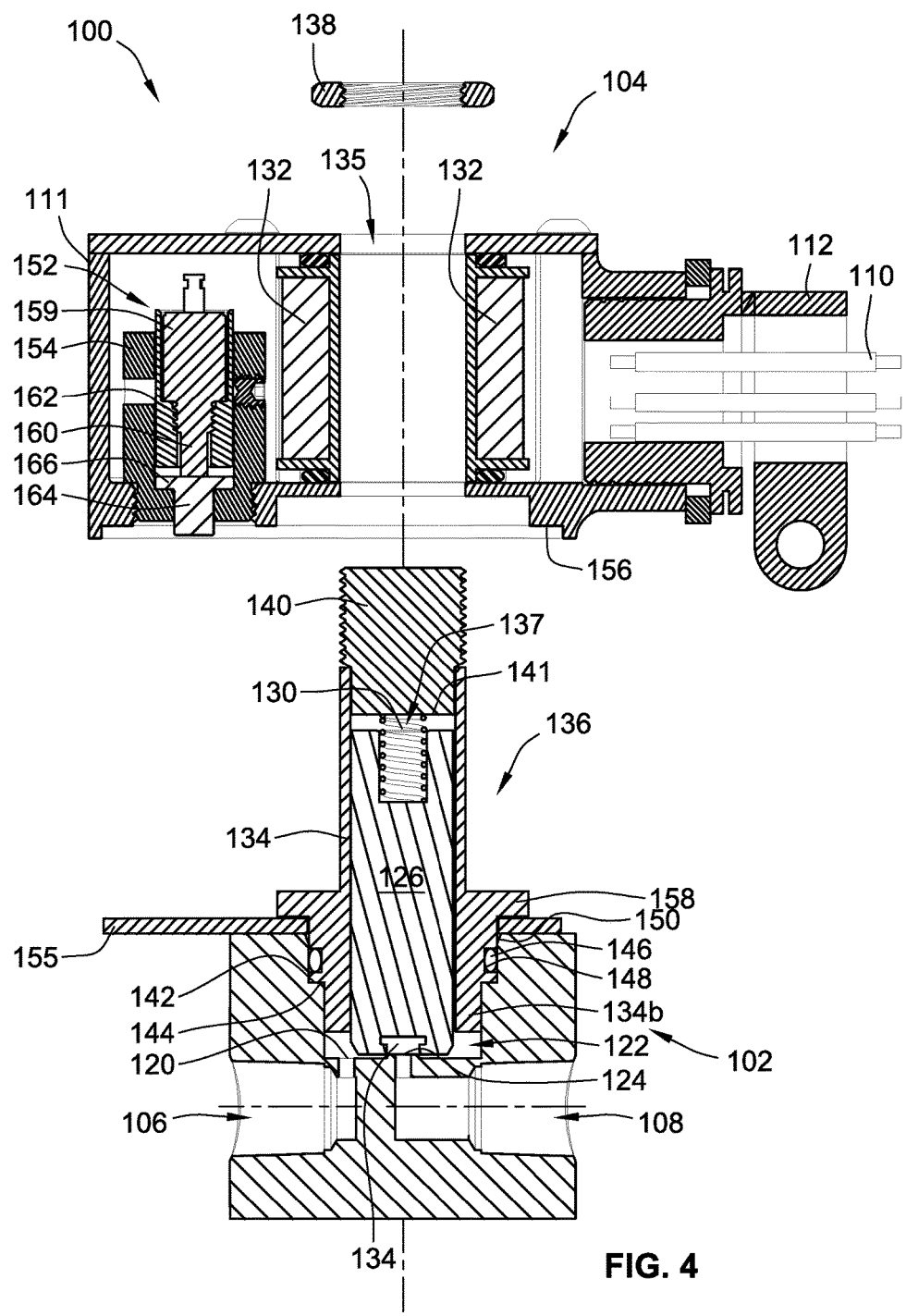
FIG. 4 is a cross-section and partially exploded view of the solenoid valve with detection device shown in FIG. 2.

As depicted in FIG. 4, to inspect the magnetic coil 132, the solenoid portion 104 is disengaged from the valve body 102. The solenoid portion 104 is disengaged from the valve body 102 by removing a locking nut 138 that engages a post 140 disposed on the armature assembly 136 at the first end 134a of the armature sleeve 134. The locking nut 138 can engage the post 140 through a variety of suitable means, including a threaded attachment, a through-pin, frictional engagement (gasket), etc. Once the locking nut 138 is removed, the solenoid portion 104 can simply be slid by a user over the armature assembly 136 and post 140 until it is clear of the valve body 102.

When the solenoid portion 104 is removed from the valve body 102, the armature assembly 136 and post 140 remain with the valve body 102 as depicted in FIG. 4. The armature sleeve 134 is seated into the valve body in a fluid-tight manner. As shown in FIG. 4, the valve body 102 features an inwardly extending circumferential ridge 142 upon which an outwardly extending circumferential step 144 on the second end 134b of the armature sleeve 134 rests. The contact between the ridge 142 and the step 144 assures that the armature sleeve 134 is inserted to a proper depth into the valve body 102 (e.g., such that the armature sleeve 134 is not inserted too far into the valve body 102). In preferred embodiments, the fluid-tight seal between the armature sleeve 134 and the valve body 102 is created using a gasket 146 disposed within a channel 148 on an exterior surface 150 of the second end 134b of the armature sleeve 134.

After inspecting the magnetic coil 132, the solenoid portion 104 is reattached to the valve body 102. Proper reinstallation of the solenoid portion 104 is important to ensure proper functioning of the solenoid valve 100. In order to help ensure that the solenoid portion 104 is properly reinstalled, a detection device 152 is provided in the housing 111 of the solenoid portion 104. The housing 111 includes a second bore 154 that contains the detection device 152.

The detection device 152 works in combination with a detection plate 155 (also referred to herein as a "rotatable plate") on the valve body 102. In this way, the solenoid portion 104 needs to be properly installed on the valve body 102 in order for the detection device 152 to interact with the detection plate 155 such that the detection device 152 registers that the solenoid portion 104 is properly installed on the valve body 102.

Figure 5:
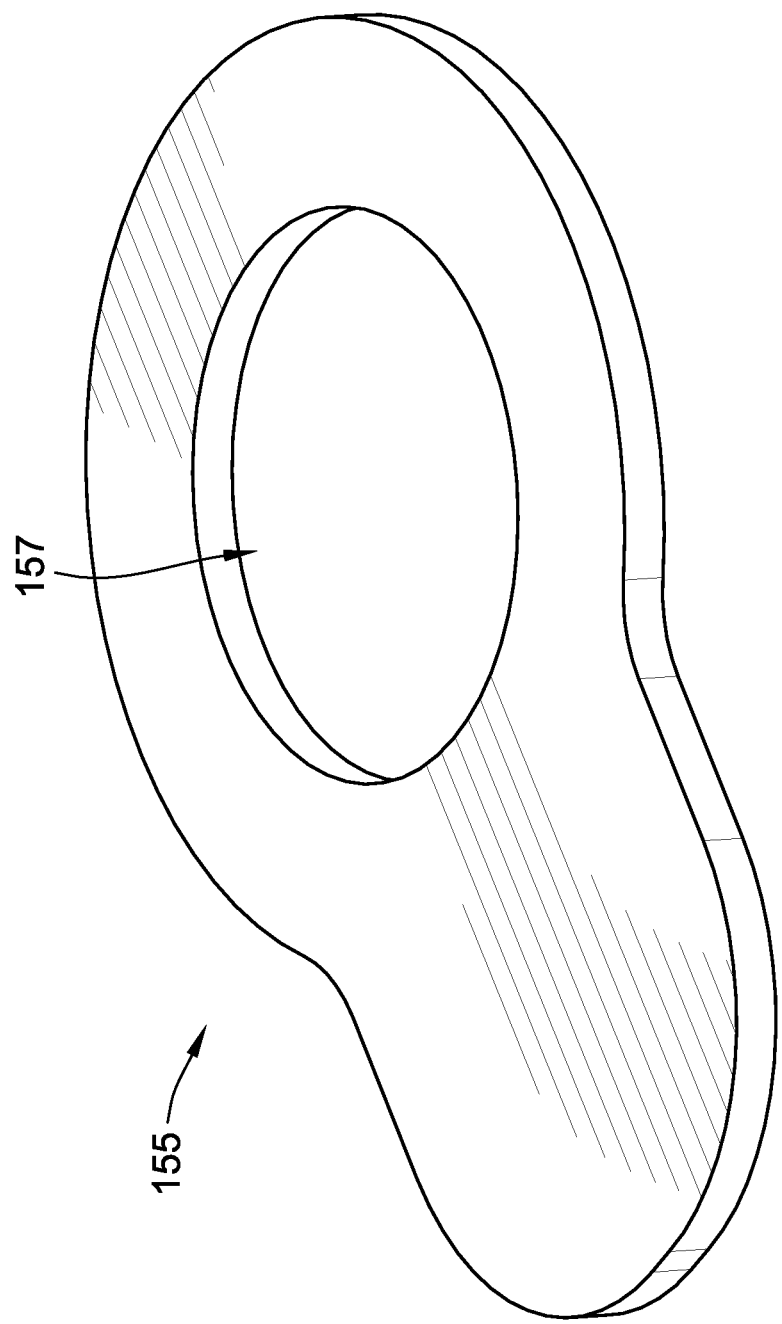
FIG. 5 is a depiction of a detection plate usable with the solenoid valve with detection device according to an exemplary embodiment.

The detection plate 155 is generally oblong in shape and is received into a depression 156 on the bottom surface (i.e., surface proximally facing the valve body 102) of the solenoid portion 104. The depression 156 has substantially the same shape as the detection plate 155. As depicted in FIG. 5, the detection plate 155 defines an aperture 157 through which the second end 134b of the armature sleeve 134 is inserted before the second end 134b of the armature sleeve 134 is inserted into the valve body 102. Returning to FIG. 4, the second end 134b of the armature sleeve 134 includes a peripheral lip 158 that contacts the surface of the detection plate 155, preventing the detection plate 155 from slipping over the armature sleeve 134 (such as, for instance, when the solenoid portion 104 is removed for inspection). Thus, when assembled and as shown in FIG. 4, the detection plate 155 is positioned between the peripheral lip 158 of the armature sleeve 134 and the valve body 102. Preferably, when received in the depression 156, the detection plate 155 is flush with the bottom surface of the solenoid portion 104 as shown in FIG. 3.

As depicted in FIGS. 3 and 4, the detection device 152 is a limit switch 159 having a plunger 160. The limit switch 159 is positioned within the second bore 154 using a rest 162 that is tailored to hold the limit switch 159 at a specific height such that the plunger 160 extends from the second bore 154 a predetermined distance. Disposed below the plunger 160 is a push button 164 with a contact plate 166. The push button 164 extends below a plane defined by the surface of the solenoid portion 104 proximally facing the valve body 102 (i.e., below the plane defined by the bottom surface of the solenoid portion 104).

When the solenoid portion 104 is properly installed on the valve body 102, the push button 164 will contact the detection plate 155, driving the contact plate 166 of the push button 164 into the plunger 160 of the limit switch 159. Alternatively, the plunger 160 of the limit switch 159 can be made long enough that the plunger 160 contacts the detection plate 155 to trigger the limit switch 159.

In an embodiment, the limit switch 159 can be a normally closed switch such that current flows through the limit switch when the plunger is not depressed. In this way, when the solenoid portion 104 is removed from or improperly installed on the valve body 102, current will flow through the limit switch, providing a signal that the solenoid valve 100 is not operable. Thus, a signal would not be provided unless the solenoid portion 104 is missing or improperly installed on the valve body 102. The signal can be audial (e.g., a beep or alarm), visual (e.g., a green light or an "all clear" signal), tactile (i.e., a vibration), or a combination of one or more of the foregoing. In another embodiment, the limit switch 159 is a normally open switch such that current does not flow through the limit switch 159 unless the plunger 160 is depressed. In this way, when the solenoid portion 104 is properly installed on the valve body 102, current will flow through the limit switch 159, providing a signal that the solenoid valve 100 is operable. Nevertheless, a person having ordinary skill in the art will recognize from this disclosure that other configurations, including configurations using normally open or closed switches, can provide various signals to indicate that the solenoid portion 104 is or is not missing and/or is or is not properly installed.

Other detection devices 152 can be used instead of a limit switch. For instance, the detection device 152 can be a light sensor that responds to a reflective patch, light source, or the absence of light located on or caused by the detection plate 155. Additionally, detection device 152 can be a proximity sensor that senses the proximity of a tag on the detection plate 155. Still further, the detection plate 155 can include an RFID chip that is read by a detection device 152 that includes an RFID sensor. These examples are not meant to be limiting, and a person having ordinary skill in the art will readily recognize from the present disclosure that other detection devices 152 can be used without departing from the spirit or scope of the present invention.

The detection plate 155 also provides another salient advantage to the solenoid valve 100. The detection plate 155 is able to rotate about the armature assembly 136, and because the detection plate 155 is received into a depression 156 in the bottom surface of the solenoid portion 104, the solenoid portion 104 will swivel with the detection plate 155 about the armature assembly 136. In this way, the location of the conduit port 112 can be moved 360° around the solenoid valve 100. This feature aids in installation of the solenoid valve 100 because conduit containing wiring can be run to the solenoid valve 100 without the installer having to bend the conduit in tight angles or awkwardly position tools to tighten the conduit into the conduit port 112.

Figure 6:
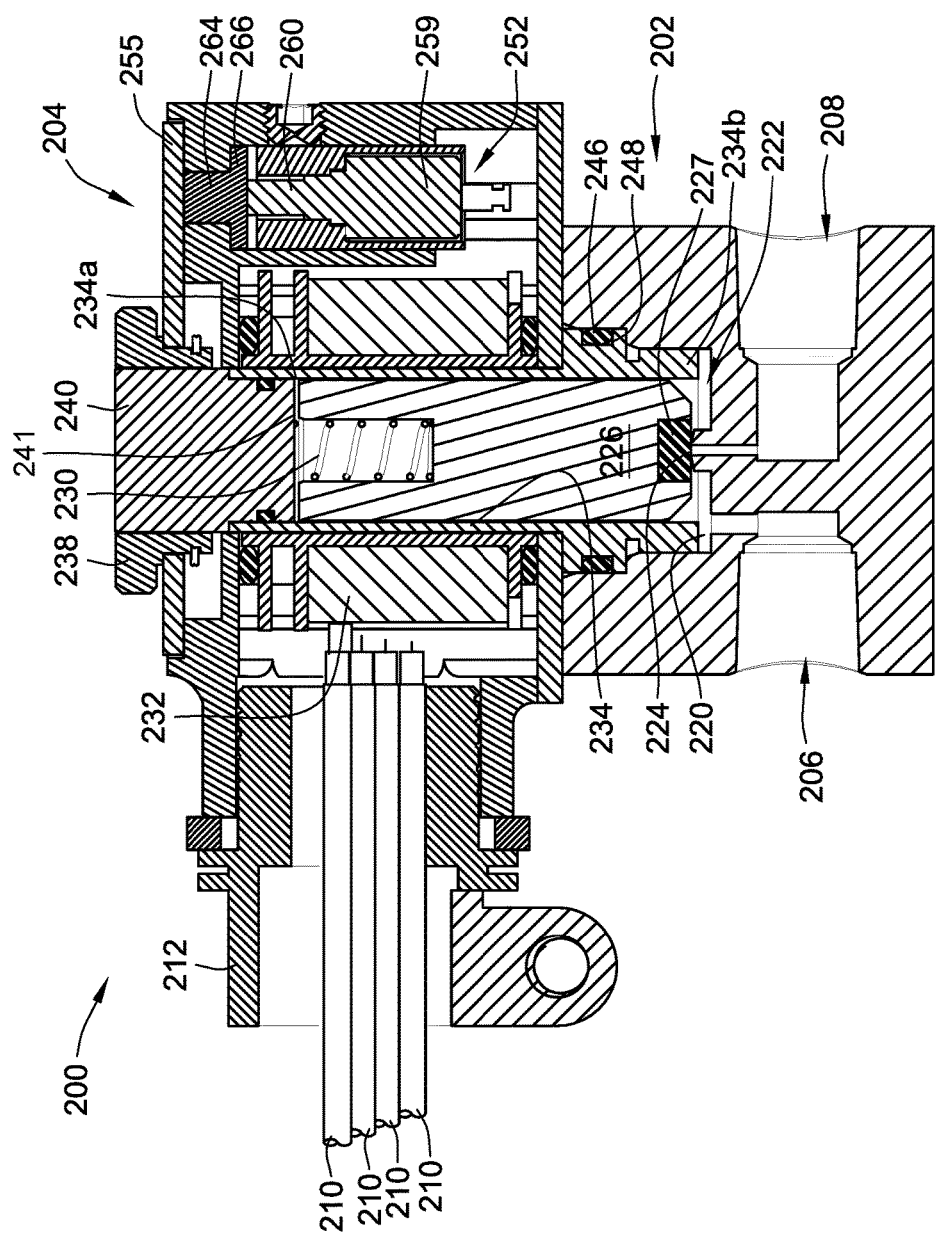
FIG. 6 is a cross-sectional view of a second embodiment of a solenoid valve with detection device according to an exemplary embodiment.
Figure 7:
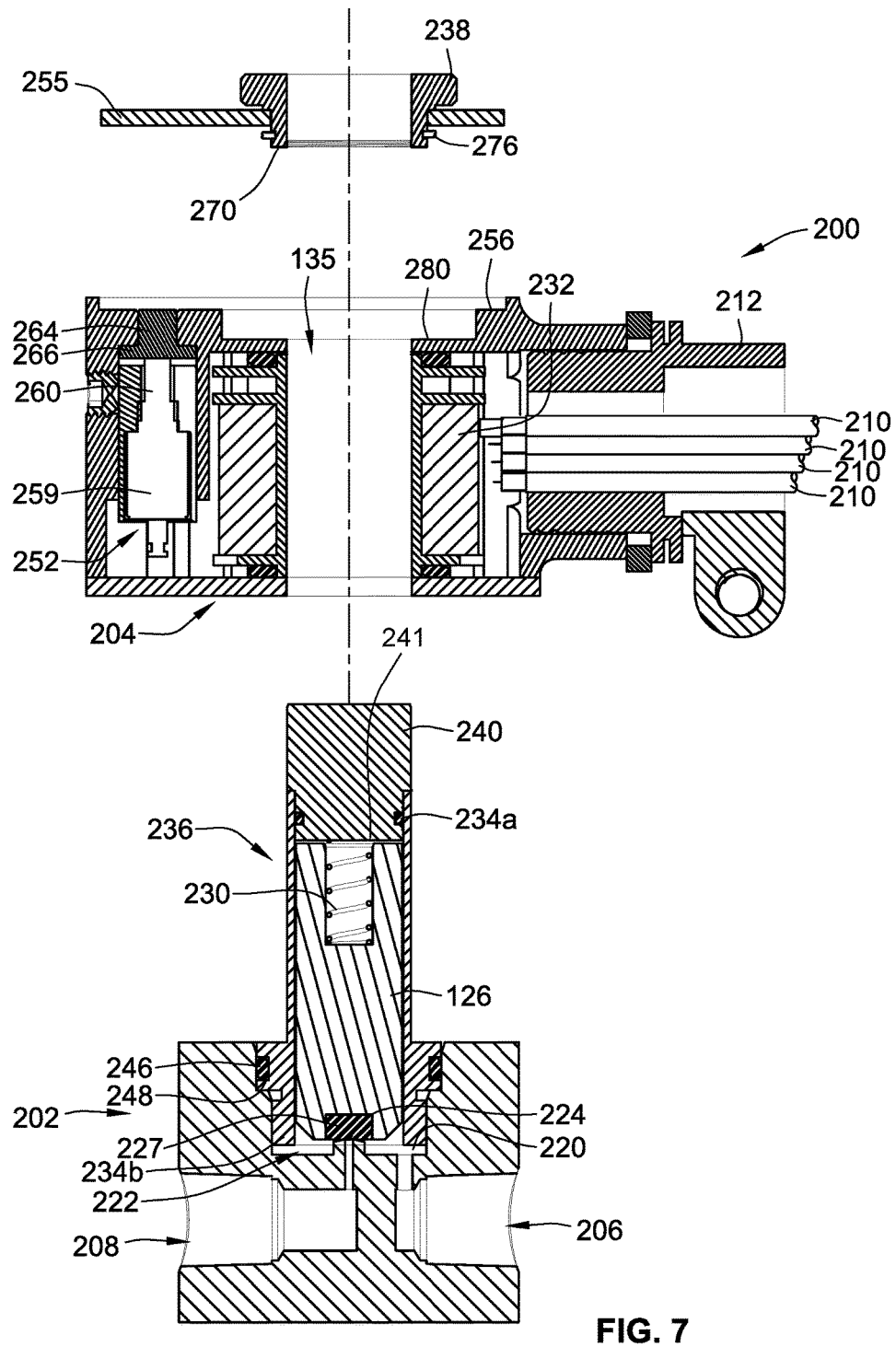
FIG. 7 is a cross-section and partially exploded view of the embodiment of the solenoid valve with detection device shown in FIG. 6.

FIGS. 6 and 7 depict another embodiment of a solenoid valve in which the detection plate is located on the opposite side of the solenoid portion as compared to the embodiments depicted in FIGS. 2-4. With respect to FIGS. 6 and 7, the components of the solenoid valve in this embodiment are generally the same and will be referred to by the same name but the element numbers are increased by one hundred.

As shown is FIG. 6, the solenoid valve 200 includes a valve body 202 and a solenoid portion 204. However, the detection plate 255 (also referred to as "rotatable plate") is not placed between the solenoid portion 204 and the valve body 202 as in previous embodiments but instead is placed between the solenoid portion 204 and the locking nut 238. In order to accommodate the detection plate 255, a depression 256 can be provided in the top surface of the solenoid portion 204 (i.e., the surface of the solenoid portion 204 proximal to the locking nut 238 as depicted in FIG. 6). Preferably, when the detection plate 255 is received into the depression 256, the detection plate 255 is flush with the top surface of the solenoid portion 204.

Because the detection plate 255 is on the top surface of the solenoid portion 204 instead of the bottom surface, the detection device 252 is inverted relative to the embodiment depicted in, e.g., FIG. 3. In the embodiment shown in FIG. 6, the detection device 252 is a limit switch 259 with a plunger 260. Thus, in the embodiment of FIG. 6, the plunger 260 is oriented to face upwardly towards the top surface of the solenoid portion 204 and, thus, towards the detection plate 255. Also, as with the prior embodiments, other detection devices 252 can be used instead of a limit switch, including light sensing switches, proximity switches, RFID sensors, etc.

FIG. 7 depicts a view of the solenoid valve 200 in which the solenoid portion 204 has been separated from the valve body 202 and the armature assembly 236. As in the prior embodiments, the solenoid valve 200 is disassembled by removing the locking nut 238 from the post 240 at the end of the armature assembly 236. Also as in the prior embodiments, a permanent magnet 241 is associates with armature assembly 236 as shown. As can be seen in FIG. 7, the detection plate 255 preferably remains with the locking nut 238 when the locking nut 238 is removed. In this way, the number of disassembled pieces of the solenoid valve 200 is reduced and, accordingly, so is the possibility of misplacing pieces. Further, by removing the detection plate 255 with the locking nut 238, the operator will assuredly disengage the detection plate 255 from the detection device 252 such that the system will detect that the solenoid portion 204 is not installed on the valve body 202.

Thus, despite the movement of the detection plate 255 and the orientation of the detection device 252, the solenoid valve 200 operates in much the same manner as the previously discussed embodiments. That is, when the solenoid portion 204 is displaced from the valve body 202 and armature assembly 236 (such as to perform a check on the solenoid portion 204), the detection device 252 and the detection plate 255 are separated as shown in FIG. 7. As discussed above, this separation interrupts a signal, changes the signal, or induces a signal that communicates the status of the solenoid valve 200.

Figure 8:
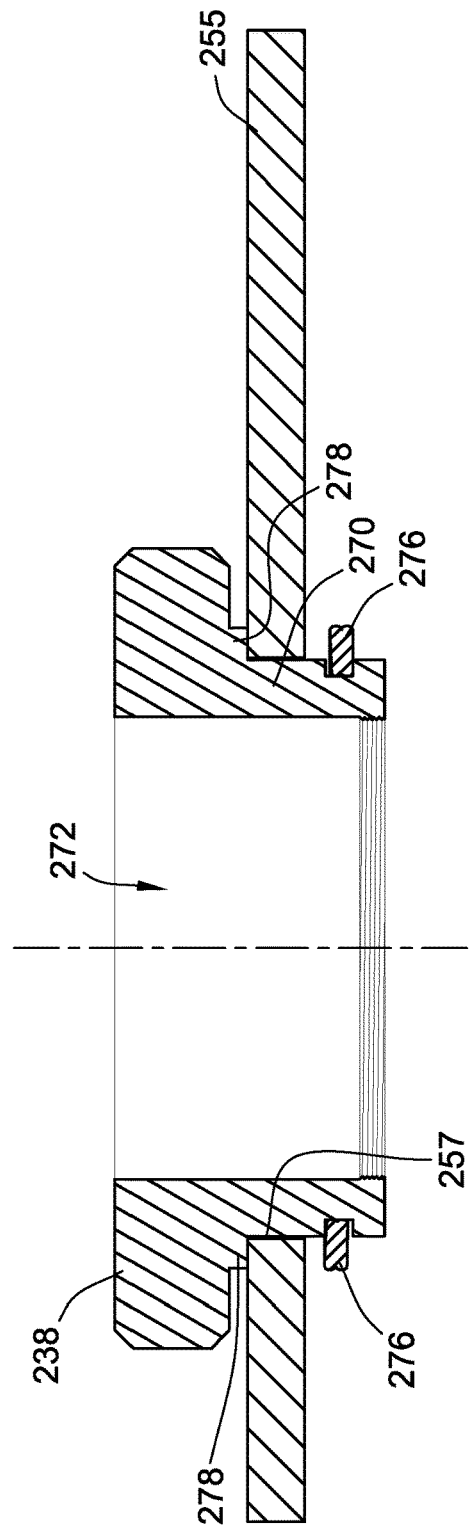
FIG. 8 is a depiction of a locking nut configured to retain the detection plate usable with the solenoid valve with detection device according to an exemplary embodiment.

As discussed above and as shown in FIG. 8, the locking nut 238 of this embodiment of the solenoid valve 200 is adapted to retain the detection plate 255 when the locking nut 238 is unseated from the solenoid valve 200. The locking nut 238 includes an extended cylinder member 270 having an inner bore 272 adapted to engage the post 240 of the armature assembly 236 (as shown in FIGS. 6 and 7). In FIG. 8, the aperture 257 of the detection plate 255 is sized so as to closely engage the outer surface of the cylinder member 270. In this way, the detection plate 255 is inserted over the cylinder member 270 and slid onto the locking nut 238. The detection plate 255 remains freely rotatable around the cylinder member 270 when placed on the locking nut 238.

The cylinder member 270 includes a circumferential groove 274 formed into the outer surface of the cylinder member 270 and placed towards the bottom of the cylinder member 270 (with respect to the orientation of the locking nut 238 as shown in FIG. 8). The groove 274 is adapted to receive a ring member 276. In embodiments, the ring member 276 is an elastic material, such as a rubber gasket, such that the ring member 276 can be stretched to fit around the cylinder member 270 and then contract to tightly engage the groove 274. However, in other embodiments, the ring member 276 can be a rigid material that is, e.g., assembled around the cylinder member 270, such as through welding, gluing, and/or another fusion process. The ring member 276 is designed to protrude from the outer surface of the cylinder member 270. As is also shown in FIG. 8, a circumferential ledge 278 can also be provided around a top portion of the cylinder member 270. In embodiments featuring the ring member 276 and the circumferential ledge 278, these features are adapted to retain the detection plate 255 on the locking nut 238 when the locking nut 238 is removed from the armature assembly of the solenoid. Thus, the space between the ring member 276 (and the accompanying groove 274, if provided) and the circumferential ledge 278 corresponds to at least the thickness of the detection plate 255.

In order to accommodate the additional size of the locking nut 238, the solenoid portion 204 can include a second depression 280 as shown in FIG. 7. As can be seen there, the second depression 280 extends below the depression 256 adapted to receive the detection plate 255.

As demonstrated in the embodiments shown in FIGS. 2-4 and 6-7, the detection plate 155, 255 can be placed on either the top or bottom surface of the solenoid portion 104, 204. Generally, the placement of the detection plate 155, 255 only affects the orientation of the detection device 152, 252. In either orientation, though, the solenoid portion 104, 204 must be properly installed on the valve body 102, 202 in order for the detection plate 155, 255 to engage the detection device 152, 252. Further, as with the solenoid portion 104 of the embodiments of FIGS. 2-4, the solenoid portion 204 of FIGS. 6 and 7 retains its ability to rotate 360° with respect to the valve body 202. As placing the detection plate 155, 255 on either the top or bottom surface of the solenoid portion 104, 204 will provide the same advantages for the solenoid valve 100, 200.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A solenoid valve, comprising:
 a solenoid portion, the solenoid portion including a detection device;
 a valve body;
 an armature assembly, the armature assembly having a first end extending through the solenoid portion and a second end extending into the valve body; and a detection plate, the detection plate configured to interact with the detection device to produce a signal indicating whether the solenoid portion is installed on the valve body;

wherein the solenoid portion is disposed between the valve body and the detection plate.

2. The solenoid valve of claim 1, wherein the detection plate is rotatable about the armature assembly.

3. The solenoid valve of claim 2, wherein the detection plate is rotatable 360° about the armature assembly.

4. The solenoid valve of claim 1, wherein the solenoid portion includes a depression adapted to receive at least a portion of the detection plate.

5. The solenoid valve of claim 1, wherein the detection device is a limit switch having a plunger, wherein the plunger is actuated by the detection plate to produce the signal.

6. The solenoid valve of claim 1, wherein the detection device is a light sensor.

7. The solenoid valve of claim 1, wherein the detection device and the detection plate interact using a proximity sensor on one of the detection device and the detection plate that senses the proximity of the other of the detection device and detection plate.

8. The solenoid valve of claim 1, wherein the detection device and the detection plate interact using an RFID sensor located on one of the detection device and the detection plate and an RFID chip located on the other of the detection device and the detection plate.

9. The solenoid valve of claim 1, further comprising a permanent magnet on the armature assembly such that the solenoid valve operates as a latching solenoid valve.

10. The solenoid valve of claim 1, wherein the solenoid valve is installed in a fire suppression or fire sprinkler system and wherein the solenoid valve is adapted to control the release of the fire suppressant fluid upon receiving a signal from a control unit of the fire suppression or fire sprinkler system.

11. A solenoid valve, comprising:
a valve body;
a solenoid portion, the solenoid portion being rotatable relative to the valve body to a first angular orientation; and
a rotatable plate, the rotatable plate being rotatable relative to the valve body to a second angular configuration;
wherein the solenoid portion is disposed between the valve body and the rotatable plate; and
wherein the second angular configuration is equal to the first angular configuration.

12. The solenoid valve of claim 11, wherein the rotatable plate can rotate to an angular orientation of 360° relative to the valve body.

13. The solenoid valve of claim 11, wherein the solenoid portion includes a depression adapted to receive at least a portion of the rotatable plate.

14. The solenoid valve of claim 13, wherein the solenoid portion rotates together with the rotatable plate relative to the valve body.

15. The solenoid valve of claim 14, wherein the solenoid portion further comprises a detection device, the detection device interacting with the rotatable plate to produce a signal indicating whether the solenoid portion is installed on the valve body.

16. A solenoid valve, comprising:
a solenoid portion, the solenoid portion including a detection device;
a valve body;
an armature assembly, the armature assembly having a first end extending through the solenoid portion and a second end extending into the valve body;
a locking nut, the locking nut comprising:
a cylinder member having an interior bore adapted to engage the armature assembly; and
a ring member that engages the outer perimeter of the cylinder member, the ring member protruding from the surface of the cylinder member and the ring member being configured to retain a detection plate of the solenoid valve when the locking nut is removed from the solenoid valve.

17. The solenoid valve of claim 16, further comprising a circumferential groove around the cylinder member, wherein the ring member is seated in the circumferential groove.

18. The solenoid valve of claim 17, further comprising a circumferential ledge around the cylinder member, wherein the circumferential ledge is spatially disposed from the ring member at a distance equal to or greater than a thickness of the detection plate.

19. A solenoid valve, comprising:
a solenoid portion, the solenoid portion including a detection device;
a valve body;
an armature assembly, the armature assembly having a first end extending through the solenoid portion and a second end extending into the valve body;
a detection plate, the detection plate configured to interact with the detection device to produce a signal indicating whether the solenoid portion is installed on the valve body;
wherein the solenoid portion is disposed between the valve body and the detection plate; and
further comprising a locking nut, the locking nut configured to attach to the first end of the armature assembly and to retain the detection plate when the locking nut is removed from the solenoid valve.

20. A solenoid valve, comprising:
a valve body;
a solenoid portion, the solenoid portion being rotatable relative to the valve body to a first angular orientation;
a rotatable plate, the rotatable plate being rotatable relative to the valve body to a second angular configuration;
wherein the solenoid portion is disposed between the valve body and the rotatable plate; and
wherein the second angular configuration is equal to the first angular configuration
wherein the solenoid portion includes a depression adapted to receive at least a portion of the rotatable plate;
wherein the solenoid portion rotates together with the rotatable plate relative to the valve body; and
wherein the solenoid portion further comprises a conduit port adapted to receive electrical wires and wherein the conduit port rotates together with the solenoid portion and rotatable plate relative to the valve body.

* * * * *